US008774285B2

(12) United States Patent
Jang et al.

(10) Patent No.: US 8,774,285 B2
(45) Date of Patent: Jul. 8, 2014

(54) METHOD AND APPARATUS FOR ADAPTIVE DECODING

(75) Inventors: Euee-Seon Jang, Seoul (KR); Chung-Ku Lee, Incheon (KR); Hyun-Gyu Kim, Seoul (KR)

(73) Assignee: Humax Co., Ltd., Seongnam-Si (KR)

( * ) Notice: Subject to any disclaimer, the term of this patent is extended or adjusted under 35 U.S.C. 154(b) by 926 days.

(21) Appl. No.: 12/937,514

(22) PCT Filed: Apr. 10, 2009

(86) PCT No.: PCT/KR2009/001847
§ 371 (c)(1), (2), (4) Date: Oct. 22, 2010

(87) PCT Pub. No.: WO2009/125993
PCT Pub. Date: Oct. 15, 2009

(65) Prior Publication Data

US 2011/0032985 A1 Feb. 10, 2011

(30) Foreign Application Priority Data

Apr. 10, 2008 (KR) ........................ 10-2008-0033011

(51) Int. Cl.
*H04N 7/12* (2006.01)
*H04N 7/50* (2006.01)
*H04N 7/26* (2006.01)
*H04N 21/434* (2011.01)

(52) U.S. Cl.
CPC ..... *H04N 21/4348* (2013.01); *H04N 19/00781* (2013.01); *H04N 19/00884* (2013.01); *H04N 19/00478* (2013.01); *H04N 19/00533* (2013.01)
USPC ................................ 375/240.25; 375/240.02

(58) Field of Classification Search
USPC .................. 375/240, 240.01, 240.02, 240.12, 375/240.16, 240.25; 708/490; 704/6
See application file for complete search history.

(56) References Cited

U.S. PATENT DOCUMENTS

| | | | | |
|---|---|---|---|---|
| 6,148,033 | A * | 11/2000 | Pearlstein et al. | 375/240.16 |
| 6,339,616 | B1 * | 1/2002 | Kovalev | 375/240.16 |
| 2002/0176508 | A1 | 11/2002 | Boyce et al. | |
| 2003/0018466 | A1 * | 1/2003 | Imaura | 704/6 |
| 2005/0265449 | A1 * | 12/2005 | Yoon | 375/240.12 |
| 2006/0126744 | A1 | 6/2006 | Peng et al. | |
| 2006/0294174 | A1 * | 12/2006 | Haque et al. | 708/490 |

* cited by examiner

*Primary Examiner* — Allen Wong
(74) *Attorney, Agent, or Firm* — Birch, Stewart, Kolasch & Birch, LLP

(57) ABSTRACT

An adaptive decoding apparatus and a method of adaptive decoding are disclosed. The adaptive decoding apparatus configuring a decoding process adaptively based on an encoding format of inputted data includes: a separating part configured to separate decoding module configuration information and encoded data from inputted data received from an outside and to output the decoding module configuration information and the encoded data; a decoding module storing part configured to store a plurality of decoding modules, the decoding modules being configured to perform a predetermined unit of partial decoding process; a decoding module configuration information analyzing part configured to analyze the encoded data according to the decoding module configuration information and to generate and output syntax parsing control information and connection control information; and a decode executing part configured to form a reconfigured decoder by loading and connecting target decoding modules from the decoding module storing part by use of the connection control information and to decode the encoded data according to the syntax parsing control information by use of the reconfigured decoder. Accordingly, the decoding process can be adaptively configured for decoding, based on the encoding format of the inputted data.

13 Claims, 8 Drawing Sheets

METHOD AND APPARATUS FOR ADAPTIVE DECODING

TECHNICAL FIELD

The present invention is related to a decoding apparatus, more specifically to a method and an apparatus for adaptive decoding that constructs a decoding process adaptively based on an encoding form of a bitstream.

BACKGROUND ART

Moving pictures are commonly transcoded to a bitstream form by an encoder. The bitstream is stored according to an encoding type that satisfies the conditions of the encoder.

MPEG requires syntax and semantics for the conditions of a bitstream.

Syntax refers to the structure or form and length of data, and indicates the order of expressing the data. In other words, syntax is for conforming to the grammar for encoding/decoding operations and defines the order, length and form of the data included in the bitstream.

Semantics indicates what each of the bits constituting the data means. That is, semantics shows the meaning of each element in the bitstream.

Therefore, various types of bitstreams can be generated according to the encoding conditions or applied standard (or codec) of the encoder. Generally, each standard (e.g., MPEG-1, MPEG-2, MPEG-4, MPEG-4 AVC, etc.) has different bitstream syntax and decoding process.

Therefore, every bitstream that is encoded according to a different standard or encoding condition has different forms of syntax, semantics and decoding process, and it is required that a decoder corresponding to the encoder be used in order to decode the bitstream.

As described above, there has been a restriction in the conventional bitstream decoder to satisfy the conditions of the encoder, and this restriction has made it difficult to realize a unified decoder that could address multiple standards.

DISCLOSURE

Technical Problem

Contrived to solve the above problem, the present invention provides an apparatus and a method for adaptive decoding that makes up a decoding process adaptively based on the encoding form of input data in order to adaptively decode a bitstream that is encoded in various forms according to different standards (e.g., MPEG-1, MPEG-2, MPEG-4, MPEG-4 AVC, etc.).

The present invention provides an apparatus and a method for adaptive decoding that makes up a decoding process adaptively based on the encoding form of input data, by structuring the decoding process organically connecting certain units of required partial decoding processes in order to decode the bitstream that is encoded in various forms.

The present invention provides an apparatus and a method for adaptive decoding that can adaptively syntax-parse and decode bitstreams having various forms of syntax.

Other objects of the present invention will become more apparent through embodiments described below.

Technical Solution

An aspect of the present invention features an adaptive decoding apparatus configuring a decoding process adaptively based on an encoding format of inputted data.

An adaptive decoding apparatus configuring a decoding process adaptively based on an encoding format of inputted data in accordance with an embodiment of the present invention can include: a separating part configured to separate decoding module configuration information and encoded data from inputted data received from an outside and to output the decoding module configuration information and the encoded data; a decoding module storing part configured to store a plurality of decoding modules, the decoding modules being configured to perform a predetermined unit of partial decoding process; a decoding module configuration information analyzing part configured to analyze the encoded data according to the decoding module configuration information and to generate and output syntax parsing control information and connection control information; and a decode executing part configured to form a reconfigured decoder by loading and connecting target decoding modules from the decoding module storing part by use of the connection control information and to decode the encoded data according to the syntax parsing control information by use of the reconfigured decoder.

An adaptive decoding apparatus configuring a decoding process adaptively based on an encoding format of inputted data in accordance with another embodiment of the present invention can include: a separating part configured to separate decoding module configuration information and encoded data from received inputted data and to output the decoding module configuration information and the encoded data; a decoding module storing part configured to store a plurality of decoding modules, the decoding modules being configured to perform a predetermined unit of partial decoding process; a decoding module configuration information analyzing part configured to analyze the encoded data according to the decoding module configuration information and to generate and output syntax parsing control information and connection control information; a decoding model generating part configured to generate target decoding modules and a decoding model by using the connection control information, the target decoding modules being needed for a decoding process of the encoded data, the decoding model indicating a connection relation between the target decoding modules; and a decode executing part configured to form a reconfigured decoder by loading and connecting the target decoding modules from the decoding module storing part by use of the decoding model and to syntax-parse and decode the encoded data according to the syntax parsing control information through the reconfigured decoder.

Another aspect of the present invention features a method of adaptive decoding that configures a decoding process adaptively based on a decoding format of inputted data.

A method of adaptive decoding by an adaptive encoding apparatus to configure a decoding process adaptively based on a decoding format of inputted data in accordance with an embodiment of the present invention can include: separating decoding module configuration information and encoded data from received inputted data; generating syntax parsing control information and connection control information on the encoded data by using the decoding module configuration information; forming a reconfigured decoder by loading and connecting at least one decoding module among a plurality of predetermined decoding modules according to the connection information; and syntax-parsing and decoding the encoded data by using the syntax parsing control information through the reconfigured decoder.

A method of adaptive decoding by an adaptive encoding apparatus to configure a decoding process adaptively based on a decoding format of inputted data can include: separating decoding module configuration information and encoded data from received inputted data; generating syntax parsing control information and connection control information on the encoded data by using the decoding module configuration information; generating target decoding modules for decoding the encoded data and a decoding model indicating a connection relation between the target decoding modules by using the connection control information; forming a reconfigured decoder by loading and connecting at least one decoding module among a plurality of predetermined decoding modules by using the decoding model; and syntax-parsing and decoding the encoded data by using the syntax parsing control information through the reconfigured decoder.

Advantageous Effects

The present invention can decode input data by adaptively structuring a decoding process based on the encoding form of the input data.

Moreover, the present invention can realize a unified decoding apparatus that can adaptively decode a bitstream that is encoded according to various standards (e.g., MPEG-1, MPEG-2, MPEG-4, MPEG-4 AVC, etc.).

The present invention can structure a decoding process adaptively based on the encoding form of input data, by structuring the decoding process organically connecting certain units of required partial decoding processes in order to decode a bitstream that is encoded in various forms.

The present invention can adaptively syntax-parse and decode bitstreams having various forms of syntax.

The present invention can realize unit functions, which constitute various decoding methods suggested by various standards (codecs), as decoding modules and can adaptively reconstruct and execute the decoding modules according to the encoding form of the input image.

DESCRIPTION OF KEY ELEMENTS

| | |
|---|---|
| 310: Separating part | 320: Decoding part |
| 410: Decompressing part | |
| 420: Decoding module configuration information analyzing part | |
| 430: Decoding module storing part | 440: Decoding model generating part |
| 450: Decode executing part | 460: Storage part |

MODE FOR INVENTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain technology is determined to evade the point of the present invention, the pertinent detailed description will be omitted.

Terms such as “first” and “second” can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in a singular form include a meaning of a plural form. In the present description, an expression such as “comprising” or “including” is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described with reference to the accompanying drawings.

Figure 1:
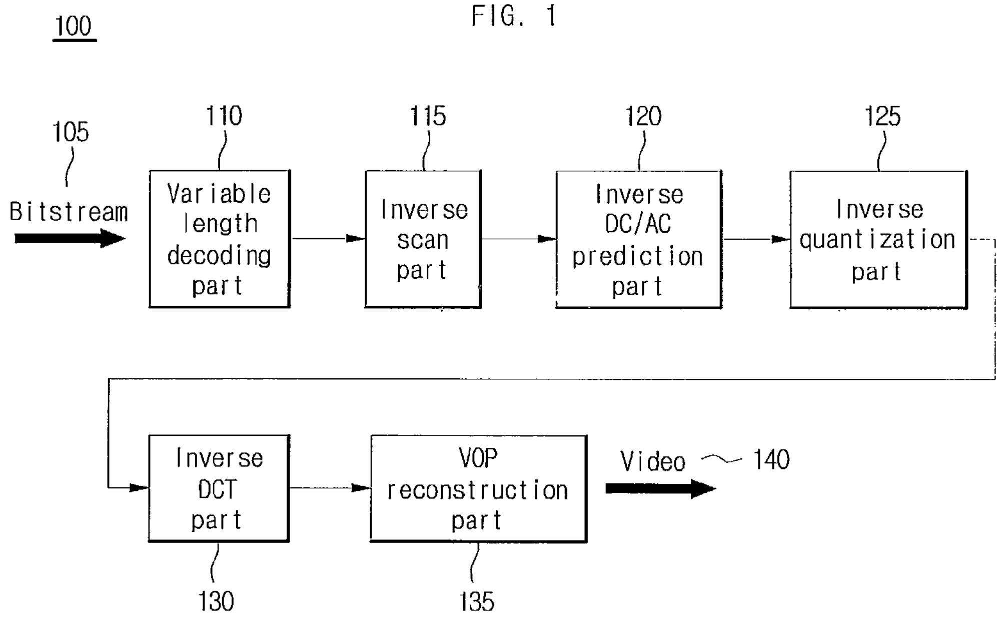
FIG. 1 is a diagram illustrating a brief structure of a typical decoder.

FIG. 1, which is a brief structural diagram of a typical decoder, illustrates a structure of a typical MPEG-4 decoder.

As illustrated in FIG. 1, a typical MPEG-4 decoder 100 includes a variable length decoding part 110, an inverse scan part 115, an inverse DC/AC prediction part 120, an inverse quantization part 125, an inverse DCT (discrete cosine transform) part 130, and a VOP reconstruction part 135. It shall be apparent that the structure of the decoder 100 can vary depending on the applied standard and that some element(s) can be substituted by other element(s).

Once a transferred bitstream 105 is syntax-parsed and header information and encoded video data are extracted, the variable length decoding part 110 creates a quantized DCT coefficient by use of a predetermined Huffman table, and the inverse scan part 115 performs an inverse scan to generate data in the same order of a moving picture 140. In other words, the inverse scan part 115 outputs a value in an order that is inverse of the order used for scanning during the encoding. After quantization is performed during the encoding, the direction of scanning can be defined according to the distribution of frequency band values. A zig-zag scan method is commonly used, but the scan method can vary according to the codec.

Syntax parsing can be unifiedly performed in the variable length decoding part 110 or in an element that processes the bitstream 105 prior to the variable length decoding part 110. In such a case, since a same standard is applied to both the encoder and the decoder, the syntax parsing is uniformly processed in accordance with a predetermined criterion in order to conform to the corresponding standard.

The inverse DC/AC prediction part 120 determines the orientation of a reference block for prediction in a frequency band by use of the size of the DCT coefficient.

The inverse quantization part 125 inversely quantizes the inverse-scanned data. That is, DC and AC coefficients are restored by use of a quantization parameter (QP) assigned during the encoding.

The inverse DCT part 130 performs an inverse discrete cosine transform to obtain an actual moving picture pixel value and generate a VOP (video object plane).

The VOP reconstruction part 135 reconstructs and outputs a video signal by use of the VOP generated by the inverse DCT part 130.

Figure 2:
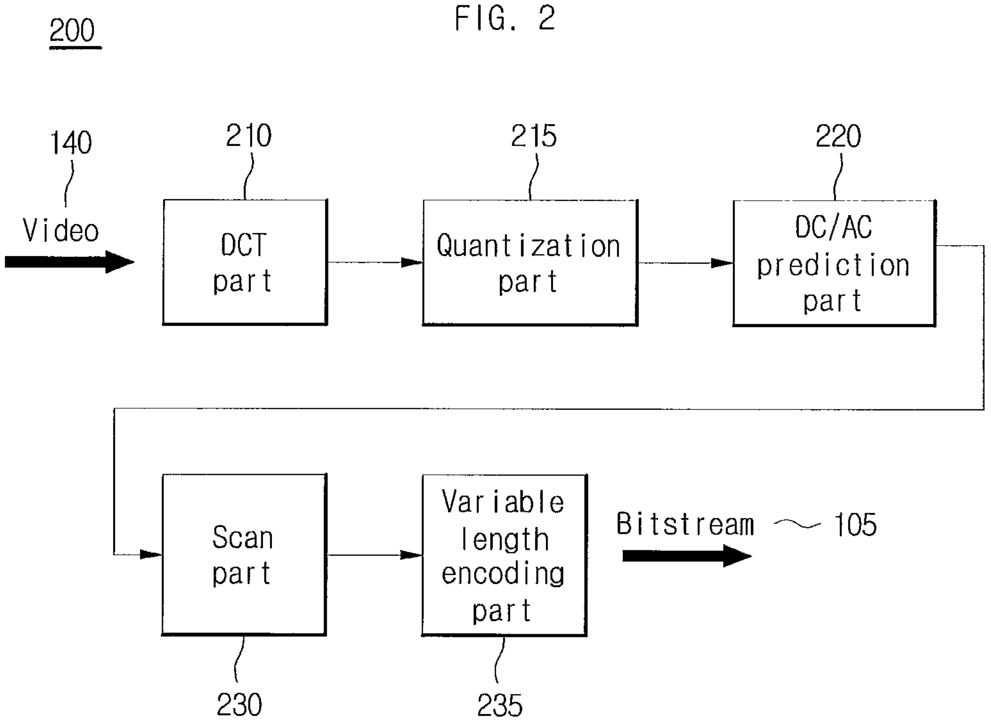
FIG. 2 is a diagram illustrating a brief structure of a typical encoder.

FIG. 2, which is a brief structural diagram of a typical encoder, illustrates a structure of a typical MPEG-4 encoder.

As shown in FIG. 2, an MPEG-4 encoder 200 typically includes a DCT part 210, a quantization part 215, a DC/AC prediction part 220, a scan part 230 and a variable length encoding part 235.

As it is evident to those who are skilled in the art to which the present invention pertains, each of the elements included in the encoder 200 performs an inverse function of its corresponding element of the decoder 100. In brief, the encoder 200 encodes a video signal (i.e., a digital image pixel value) by transforming the video signal to a frequency value through discrete cosine transform, quantization, etc., and then performs variable length encoding, which differentiates the bit length according to the frequency of data, to output the bitstream 105 in a compressed state.

An apparatus for adaptive decoding in accordance with the present invention is constituted differently from the conventional decoder described above.

The apparatus for adaptive decoding in accordance with the present invention includes a plurality of decoding modules that can constitute a decoder by being adaptively configured based on the encoding format in order to decode a bitstream based on various encoding formats. The decoder in which the decoding modules are adaptively configured based on the encoding format of the inputted bitstream will be referred to as the "reconfigured decoder" hereinafter.

The decoding module is a functional module that carries out a process that partially constitutes the decoding process, that is, a partial decoding process of a certain unit. For example, each process of the variable length decoding part 110, the inverse scan part 115, the inverse DC/AC prediction part 120, the inverse quantization part 125, the inverse DCT part 130 and the VOP reconstruction part 135 shown in FIG. 2 can be realized in a decoding module, and particular units of the processes that constitute the process of each of the above elements can be realized in a decoding module.

The adaptive decoding apparatus can use decoding module information to configure decoding modules required according to the encoding format of the inputted bitstream, constituting the reconfigured decoder adaptively. As a result, the adaptive decoding apparatus in accordance with the present invention can form a reconfigured decoder that corresponds to the encoding format of the inputted bitstream and decode the corresponding bitstream, regardless of the format in which the bitstream is encoded.

The adaptive decoding apparatus receives decoding module configuration information together with the bitstream. The decoding module configuration information can be provided to the decoding apparatus in the form of a bitstream combined with the bitstream or in the form of independent data. It is of course possible that the providing of the decoding module configuration information is omitted if information corresponding to the decoding module configuration information is pre-stored in a specific storage part of the adaptive decoding apparatus. However, the following description will consider that corresponding data is included in the bitstream and provided to the decoding apparatus. Hereinafter, the adaptive decoding apparatus in accordance with the present invention will be described in more detail with reference to relevant drawings. It shall be apparent that the below-described elements of the adaptive decoding apparatus can be embodied in a software program (or a combination of program codes) that is designed to perform their corresponding functions.

Figure 3:
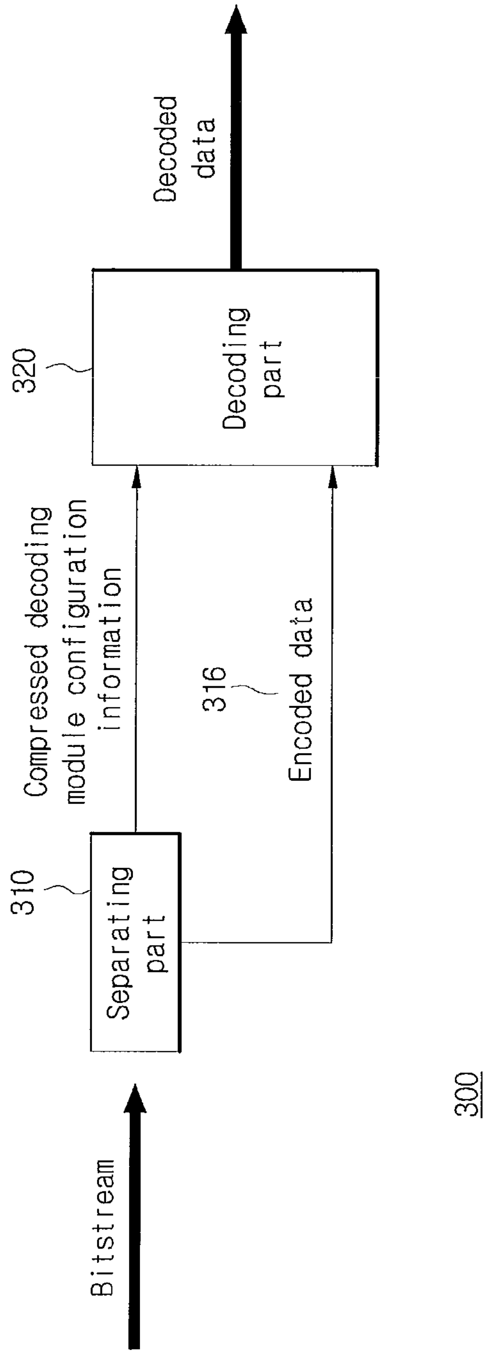
FIG. 3 is a structural diagram of a decoding apparatus in accordance with an embodiment of the present invention.

FIG. 3 is a structural diagram of a decoding apparatus in accordance with an embodiment of the present invention.

As illustrated in FIG. 3, an apparatus for adaptive decoding 300 can be constituted by including a separating part 310 and a decoding part 320.

The separating part 310 separates inputted bitstream into compressed decoding module configuration information and encoded data and inputs each of them into the decoding part 320. If the compressed decoding module configuration information and the encoded data are each inputted as separate data, the separating part 310 may be omitted. The encoded data can have a format that is identical or similar to the bitstream of FIG. 1.

The decoding part 320 configures a decoder by combining required decoding modules by use of the inputted decoding module configuration information and outputs decoded video data by decoding the encoded data.

The decoding module configuration information describes information for configuring the decoder by combining the decoding modules and for decoding the inputted data based on XML (Extensible Markup Language), and is constituted by including syntax parsing control information, connection control information and context control information.

The syntax parsing control information describes syntax of the encoded data and includes information in which the order, length and output port of each of the data constituting the encoded bitstream are described. The syntax parsing control information is used for syntax-parsing of the encoded data.

The connection control information describes decoding modules needed for decoding the encoded data, and includes information on the decoding module needed for constituting the decoder and information in which connection relations between decoding modules are described.

The context control information is information on a constant and a variable to which the decoding module refers.

The syntax parsing control information can be described using facets included in an element of an XML file. The connection control information can express the connection relation between the decoding modules by designating a port number to the facet of the element that stores the connection control information (referred to as "connection information element" for the convenience of description). In addition, a sub-element of a pertinent connection information element can be generated, and the sub-element can store not only information on the connection relation between two modules but also additional information on connection relation such as the size of data that is to be transferred. The method of describing the decoding module configuration information based on XML will be described later with reference to the relevant drawings.

Figure 4:
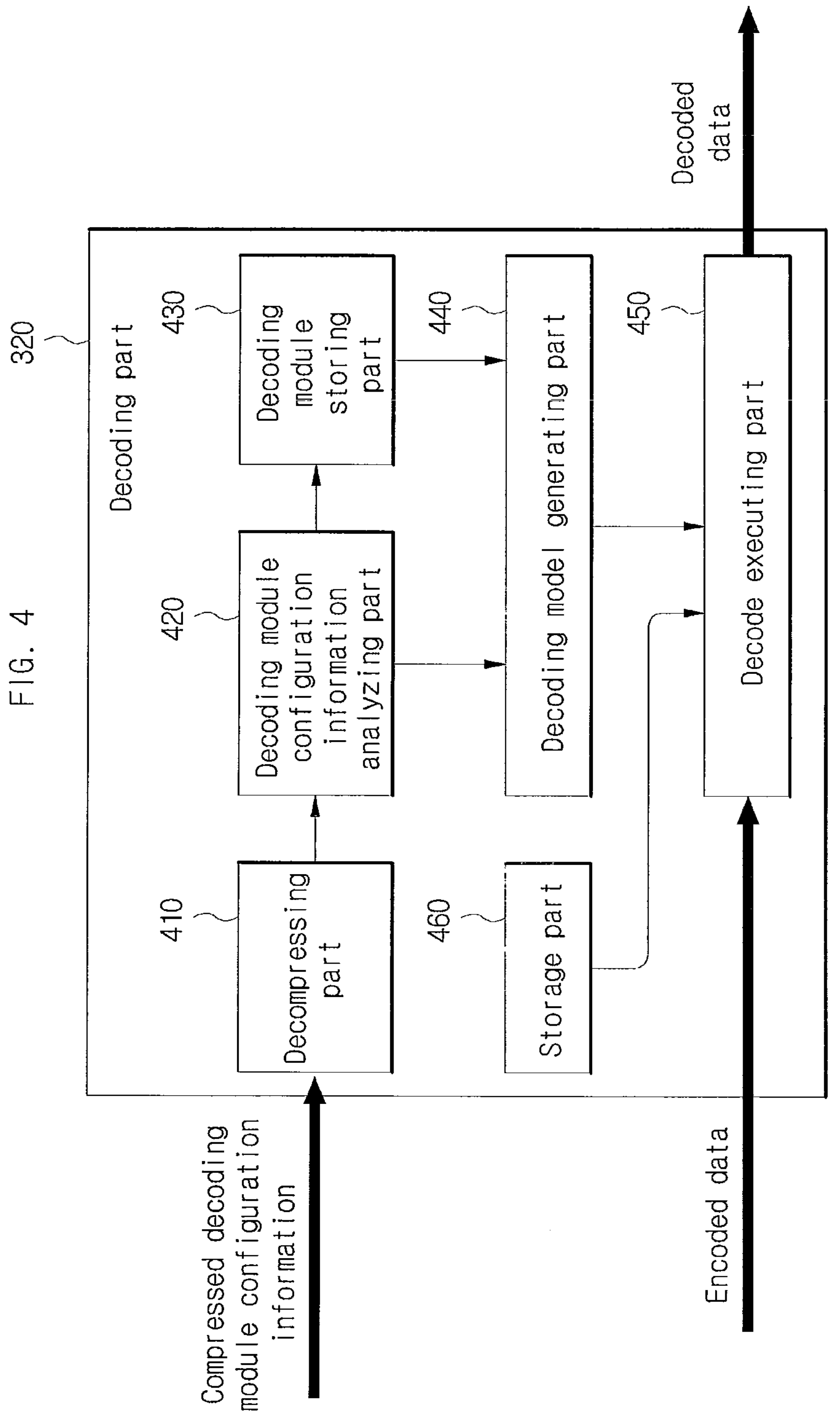
FIG. 4 is a structural diagram of an embodiment of a decoding part shown in FIG. 3.

FIG. 4 is a structural diagram of an embodiment of the decoding part shown in FIG. 3.

As shown in FIG. 4, the decoding part 320 includes a decompressing part 410, a decoding module configuration information analyzing part 420, a decoding module storing part 430, a decoding model generating part 440, a decode executing part 450 and a storage part 460.

The decompressing part 410 decompresses compressed decoding module configuration information that is inputted from the separating part 310 and outputs the XML-based decoding module configuration information to the decoding module configuration information analyzing part 420. According to the present embodiment, the decoding module configuration information is transferred by being compressed to a binary code for high transfer efficiency, and the decompressing part 410 decompresses received data, which is compressed in the binary code, to XML-based data. It shall be apparent that various binary code conversion methods can be applied to the process of compressing the XML-based data to the binary code and decompressing. Of course, in case the decoding module configuration information is received without being compressed, the decompressing part 410 can be omitted.

The decoding module configuration information analyzing part 420 analyzes the inputted XML-based decoding module configuration information and detects and outputs the context control information, connection control information and syntax parsing information. Here, the decoding module configuration information analyzing part 420 can analyze the decoding module configuration information that is described in an XML format in accordance with the method of describing a bitstream structure defined in the BSDL schema standard (ISO/IEC 23001-5 BSDL). For example, in case there is unit information called "bs2:if", whether or not the bitstream indicated by the corresponding syntax is to be recognized can be shown through a conditional expression included in the unit information.

The decoding module storing part 430 stores a plurality of decoding modules that perform a predetermined unit decoding process. The plurality of decoding modules include a parsing module, which performs syntax parsing, and processing modules for decoding syntax-parsed data.

The parsing module syntax-parses a bitstream inputted based on the syntax parsing control information. By using the syntax parsing control information, the parsing module in accordance with the present invention is not restricted to a particular bitstream and can perform the syntax parsing for various bitstreams. An example of the processing module can be an I DCT decoding module, which performs the function of reconstructing a VOP by performing an inverse DCT operation.

The decoding module storing part 430 outputs a corresponding decoding module pursuant to a request by the decode executing part 450. Moreover, it shall be apparent that the decoding module storing part 430 can add a new decoding module or delete an existing decoding module pursuant to an input by a user.

The decoding model generating part 440 uses the connection control information to generate and output decoding modules needed for the decoding process and a decoding model that defines the connection relation between these decoding modules. The decoding model has a structure in which decoding modules required for decoding the inputted data are organically connected to a tail end of the parsing module, and can be realized as a block diagram form of GUI to be displayed to the user. The decoding model generating part 440 outputs the decoding model and/or connection control information to the decode executing part 450.

The decode executing part 450 constitutes the reconfigured decoder by using the decoding model or connection control information to load and connect the decoding modules required for the decoding process from the decoding module storing part 430, and syntax-parses and decodes the inputted data through the decoding modules constituting the reconfigured decoder by using the syntax parsing control information and context control information.

The detailed process performed by the decode executing part 450 is as follows.

The decode executing part 450 is inputted with encoded data from the separating part 310. Then, the decode executing part 450 forms the reconfigured decoder by loading and connecting the parsing module and the processing modules required for the decoding, by use of the decoding model or connection control information. The reconfigured decoder has a structure in which a plurality of processing modules are organically connected to the tail end of the parsing module.

Then, the decode executing part 450 syntax-parses the encoded data inputted through the parsing module by using the syntax parsing control information, and performs the decoding process for the inputted data by outputting the syntax-parsed data to the processing module that is connected to the tail end of the parsing module. Here, the decode executing part 450 can modify some of the context control information by using the parsed information.

The storage part 460 temporarily stores information needed in the decoding process. For example, the storage part 460 can receive and store the syntax-parsed data and syntax supplementary information (e.g., length information of an element and output port information) from the parsing module. Moreover, the storage part 460 can output stored information to the decode executing part 450 pursuant to a request by the decoding module.

It is not necessarily required that the decoding module configuration information include information corresponding to all decoding module configuration information, and the decoding module configuration information can include a codec number and a profile and level number. In case the codec number and the profile and level number are included, the decompressing part 410 can output the stored decoding module configuration information to the decoding module configuration information analyzing part 420. In case the codec number, the profile and level number and configuration information on some decoding modules are inputted, the decompressing part 410 can modify the stored decoding module configuration information according to the configuration information on some decoding modules and output the modified decoding module configuration information to the decoding module configuration information analyzing part 420.

Hereinafter, a syntax parting process in accordance with the present information will be described with an example of the decoding module configuration information that includes the syntax parsing control information.

```
<xsd:element name="VideoObject">
<xsd:complexType>
  <xsd:sequence>
    <xsd:element name="VOStartCode"
type="m4v:StartCodeType"/>
    <xsd:element name="VOL">
      <xsd:complexType>
        <xsd:sequence>
        <xsd:element name="header"      type="VOLHeaderType"
      bs2:ifNext="&volSC;" rvc:port="0"/>
        <xsd:element name="VOP"
type="VideoObjectPlaneType"
maxOccurs="unbounded"
bs2:ifNext="&vopSC;" rvc:port="1"/>
        </xsd:sequence>
        </xsd:complexType>
      </xsd:element>
    </xsd:sequence>
  </xsd:complexType>
</xsd:element>
```

The above decoding module configuration information, which is written in XML (that is, BSDL), is the part of the entire decoding module configuration information that is relevant to syntax parsing. The decoding module configuration information analyzing part 420 analyzes the inputted information in units of facets in accordance with the XML parsing rules. The syntax parsing control information, in which the inputted information is extracted according to the XML parsing rules, is shown in Table 1 below.

TABLE 1

| Element Name | Element Type | Upper level element | Facet | | | |
|---|---|---|---|---|---|---|
| | | | Type | ifNext | maxOccurs | rvc:Port |
| VideoObject | Sequence | (root) | | | | |
| VOStartCode | Node | VideoObject | m4v:StartCodeType | | | |
| VOL | Sequence | VideoObject | | | | |
| Header | Node | VOL | VOLHeaderType | &volSC | | #0 |
| VOP | Node | VOL | VideoObjectPlaneType | &vopSC | Unbounded | #1 |

The parsing module is inputted with the syntax parsing control information from the decode executing part 450 and performs syntax parsing. Here, the parsing module can refer the facet of each element by using the element name as an index. The facet defines the syntax parsing process as follows.

Type facet: Indicates the bit length of an element and the form of information (e.g., integer, float, etc.). The type of VOP element is "VideoObjectPlaneType" that defines the bit length of the element and the form of information for each type in the BSDL standard.

if Next facet: Pursuant to the BSDL standard, the decode executing part 450 can use the information of pertinent element, only if the information of the bitstream is within a range disclosed in if Next.

maxOccurs facet: Indicates the maximum number of repeated occurrences of the pertinent element according to the BSDL standard on the bitstream. Here, "Unbounded" indicates that unlimited repetitions are possible.

rvc:Port facet: Indicates the index number of the output port of the parsing module.

The decode executing part 450 controls the parsing module to output the syntax-parsed data to the processing module that is connected to the output port of the parsing module. Moreover, the present invention can use other facets, the definitions of which are pursuant to the BSDL schema standard (ISO/IEC 23001-5 BSDL), in addition to the above facets.

Figure 5:
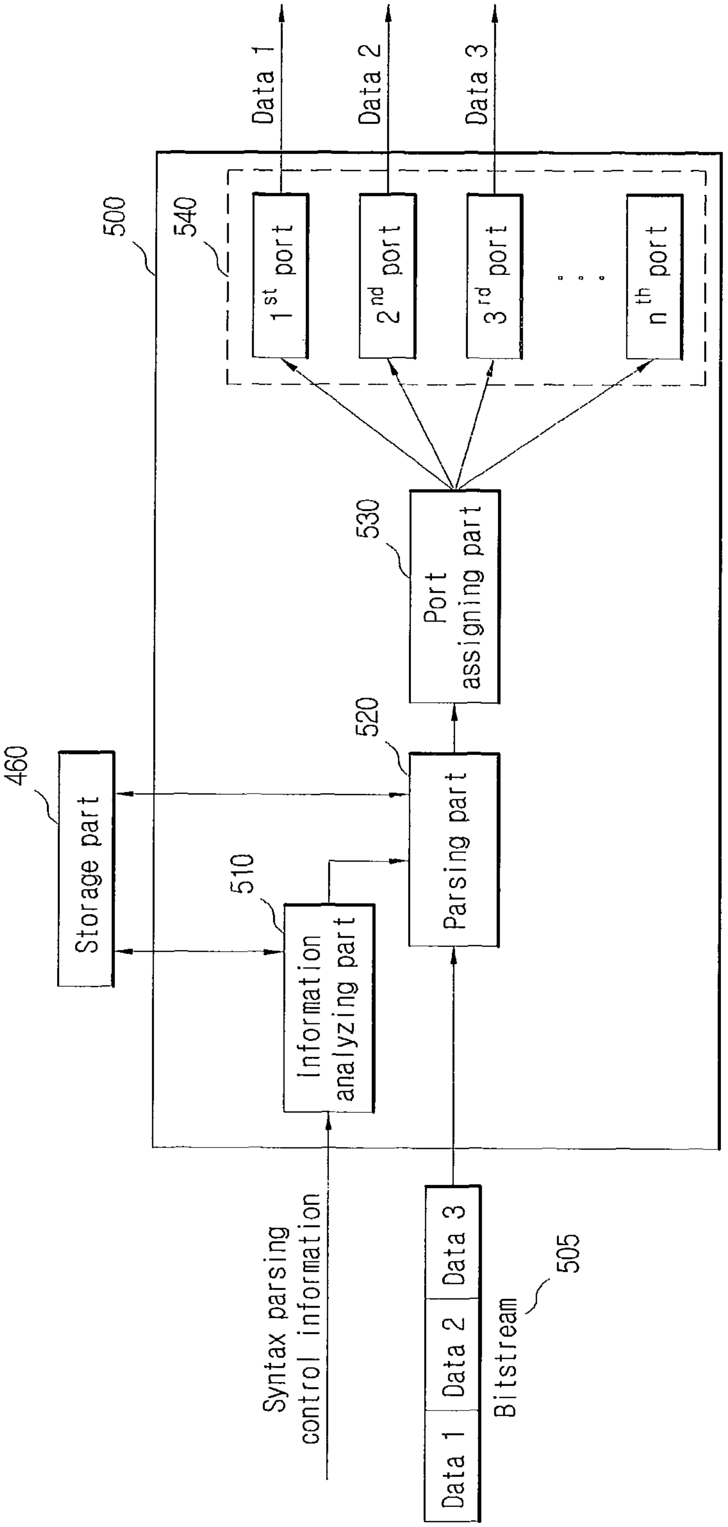
FIG. 5 is a structural diagram of a parsing module in accordance with an embodiment of the present invention.

FIG. 5 is a structural diagram of a parsing module in accordance with an embodiment of the present invention.

As illustrated in FIG. 5, the parsing module includes an information analyzing part 510, a parsing part 520, a port assigning part 530 and an output part 540, which is constituted by a plurality of output ports (a first port, a second port, . . . , an $n^{th}$ port).

The information analyzing part 510 analyzes the syntax parsing control information inputted from the decode executing part 450 and extracts the lengths of data that constitute the bitstream to be parsed as well as the port number of the output port.

Described below is a process of computing the data length and output port information by the information analyzing part 510, with an example of the decoding module configuration information in accordance with an embodiment of the present invention.

```
<xsd:element name="TestStream">
<xsd:complexType>
<xsd:sequence>
  <xsd:element name=" syntax1" type=" b3" rvc:port=" 1" />
  <xsd:element name=" syntax2" type=" b4" rvc:port=" 2" />
  <xsd:element name=" syntax3" type=" b2" rvc:port=" 3" />
</xsd:sequence>
</xsd:complextype>
</xsd:element>
```

The above decoding module configuration information written in XML (BSDL) is the portion of the whole decoding module configuration information that is related to syntax parsing. The syntax parsing control information, to which the decoding module configuration information analyzing part 420 has extracted the inputted decoding module configuration information pursuant to XML analysis rules, is illustrated in Table 2 below.

TABLE 2

| Element name | Element type | Element node | Facet Type | rvc:Port |
|---|---|---|---|---|
| TestStream | Sequence | (root) | (Hierarchical) | N/A |
| Syntax1 | Syntax | TestStream | b3 | #1 |
| Syntax2 | Syntax | TestStream | b4 | #2 |
| Syntax3 | Syntax | TestStream | b2 | #3 |

In the above example, the bit length of each element is shown in the "Type" column under "Facet." The information analyzing part 510 analyzes the extracted syntax parsing control information to compute the data length and the output port information. Here, the information analyzing part 510 can compute the length of data by analyzing the type facet in accordance with a format defined by the BSDL schema standard (ISO/IEC 23001-5 BSDL). For example, through "b3" indicated in the type facet, the information analyzing part 510 grasps that data 1 is 3 bits long. Then, the information analyzing part 510 finds out that the output port of data 1 is a first port, by checking out the rvc:Port facet. The information analyzing part 510 can extract the length and output port number for data 2 and data 3 in the same manner as data 1.

Moreover, the information analyzing part 510 can analyze the type facet by use of data that has been parsed already. For example, the information analyzing part 510 can use the earlier-parsed data to analyze the syntax parsing control information and compute the length of the current data. Here, the information analyzing part 510 can request for and receive the earlier-parsed data from the storage part 460.

The information analyzing part 510 outputs the name, length and output port number of the pertinent data to the parsing part 520.

The parsing part 520 uses the data length and output port number, which are inputted from the information analyzing part 720, to syntax-parse the inputted bitstream. For example, the parsing part 520 learns that the length of data 1 is 3 and extracts 3 bits from the bitstream. The parsing part 520 outputs the extracted 3-bit data and output port number to the port assigning part 530.

The port assigning part 530 assigns the inputted data to a pertinent output port in accordance with the output port number inputted from the parsing part 520.

The output part 540 outputs the data assigned to the pertinent output port to an input port of the connected decoding module according to the connection control information. For example, the port assigning part 530 assigns data 1 to the first port. Then, the output part 549 outputs data 1 to an input port of the decoding module that is connected with the pertinent output port.

Afterwards, the parsing module parses data 2 and data 3 in the same manner as the syntax parsing process of data 1.

The decoding apparatus in accordance with the present invention can parse various kinds of syntax without changing its structure, by allowing the parsing module to use the syntax parsing control information. Therefore, in case the decoding apparatus in accordance with the present invention is embodied in an actual hardware chip, it can be guaranteed that bitstreams encoded in various formats can be decoded in real time by a single hardware chip.

Hereinafter, connection control information and context control information that are described in an XML format in accordance with an embodiment of the present invention will be described.

Figure 6:
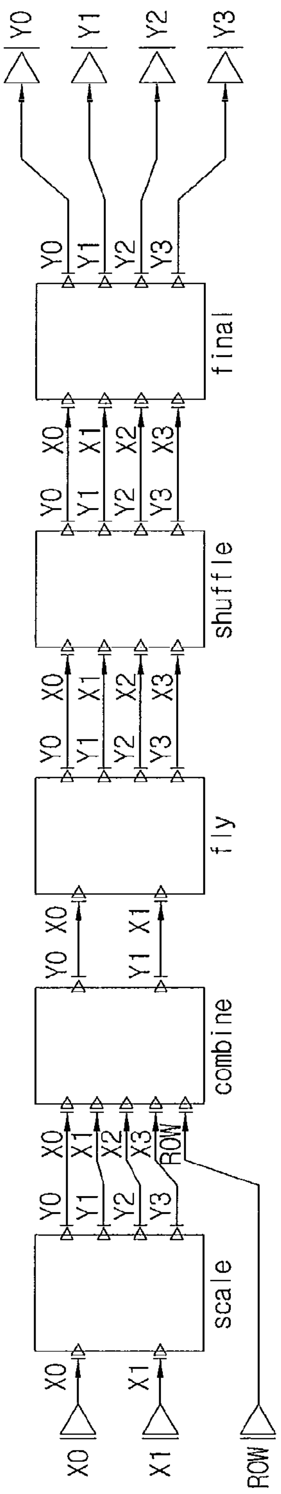
FIG. 6 is an illustration of a decoding module that is connected to realize 1-D IDCT in accordance with an embodiment of the present invention.
Figure 7:
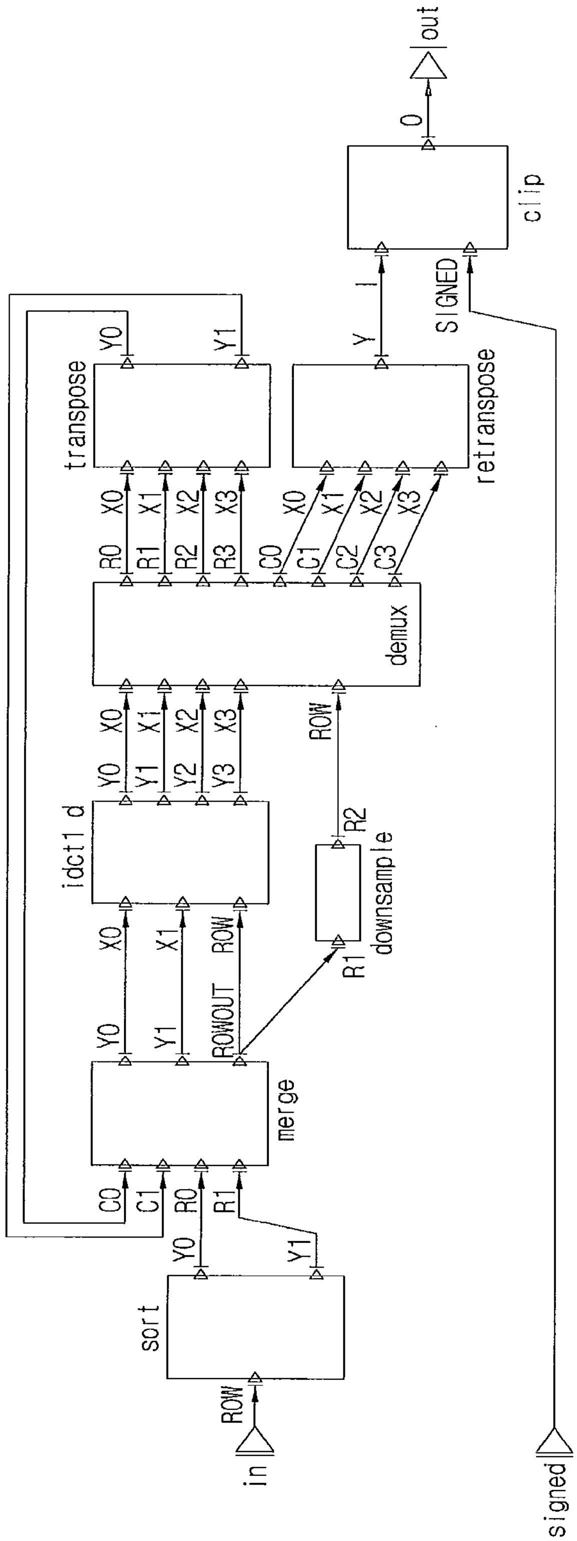
FIG. 7 is an illustration of a decoding module that is connected to realize 2-D IDCT in accordance with an embodiment of the present invention.

FIG. 6 is an illustration of a decoding module that is connected to realize 1-D IDCT in accordance with an embodiment of the present invention, and FIG. 7 is an illustration of a decoding module that is connected to realize 2-D IDCT in accordance with an embodiment of the present invention.

The connection control information included in the decoding module configuration information described in XML in accordance with an embodiment of the present invention is described using elements shown in Table 3 below.

TABLE 3

| | |
|---|---|
| Network | Identification information of structure connected with decoding modules<br>Supplementary attributes: @name - name of structure; @version - current version of structure<br>Supplementary sub-elements: Package, Decl, Port, Instance, Connection |
| Package | Element indicating QID (qualified identifier, which indicates a position in a hierarchic structure)<br>Essential sub-element: QID |
| Decl[@kind="Param"] | Declaration of parameter of decoding module configuration<br>Essential attribute: @name - name of parameter<br>Supplementary sub-element: Type - type of parameter |
| Decl[@kind="Var"] | Declaration of variable<br>Essential attribute: @name - name of variable<br>Essential sub-element: Expr - value of variable<br>Supplementary sub-element: Type - type of variable |
| Port | Declaration of port of decoding module configuration<br>Essential attribute: @name - name of port; @kind - distinction information or input or output port<br>Supplementary sub-element: Type - type of port |
| Instance | Generation of instance of decoding module<br>Instance is generated in two parts: (1) defining the class of decoding module and the list of parameter values of decoding module; (2) defining expression (to be described later) for computation of parameter |
| Connection | Representation of connection relation between two ports in decoding module configuration<br>Essential attribute: @src - ID of source decoding module; @dst - ID or target decoding module<br>Supplementary sub-element: Supplementary attribute of Attribute-Connection |

As described in Table 3 above, the connection control information includes Network, which is an identification information of a structure in which certain decoding modules are connected, Package or QID, which is identification information indicating the position in a hierarchic structure, Port, which is port information of the decoding module, Connection, which is connection information of input/output port between decoding modules that are connected to each other, etc.

Table 4 shows the context control information included in the decoding module configuration information that is described in XML in accordance with an embodiment of the present invention.

TABLE 4

| | |
|---|---|
| Expr[@kind="Literal"] | Constant |
| Expr[@kind="Literal"][@literal-kind="Boolean"] | Boolean type of constant<br>Essential attribute: @value - 0 or 1 |
| Expr[@kind="Literal"][@literal-kind="Integer"] | Integer type of constant<br>Essential attribute: @value - integer value |
| Expr[@kind="Literal"][@literal-kind="Real"] | Real type of constant<br>Essential attribute: @value - integer value |
| Expr[@kind="Literal"][@literal-kind="String"] | String type of constant<br>Essential attribute: @value - sentence |

TABLE 4-continued

| | |
|---|---|
| Expr[@kind="Literal"][@literal-kind="Character"] | Character type of constant<br>Essential attribute: @value - character |
| Expr[@kind="Var"] | Variable<br>Essential attribute: @name - name of variable |
| Expr[@kind="Application"] | Represents expression and factor of particular function<br>Essential attribute: Expr - expression of function; Args - factor |
| Expr[@kind="UnaryOp"] | Unary operation function<br>Essential attribute: Op - operator; Expr - expression of operand |
| Expr[@kind="BinOpSeq"] | Binary operation function<br>Essential attribute: Op - operator; Expr - expression of operand |

Table 5 below shows elements in accordance with an embodiment of the present invention that indicate, in addition to the elements described above, whether the factor or operator is unary.

TABLE 5

| | |
|---|---|
| Args | Factor of function<br>Essential attribute: Expr - factor expression |
| Op | Determines whether operator is unary or binary<br>Essential attribute: @name - name of operator |

Table 6 below shows type elements used when a port or port is declared in accordance with an embodiment of the present invention.

TABLE 6

| | |
|---|---|
| Type | Indicates data type<br>Essential attribute: @name - name of type<br>Supplementary sub-element: Entry - entry for connecting an object with a parameter |
| Entry[@kind="Expr"] | Value parameter of type<br>Essential attribute: @name - name of parameter<br>Essential sub-element: Expr - expression used for computing attribute value |
| Entry[@kind="Type"] | Type parameter of type<br>Essential attribute: @name - name of parameter<br>Essential sub-element: Type - available type of parameter |

Table 7 below shows elements that are defined in addition to the above elements in accordance with an embodiment of the present invention.

TABLE 7

| | |
|---|---|
| Attribute | Element indicating additional information regarding connection relation of decoding modules<br>There are 4 kinds.<br>1. flag: name information<br>2. String attributes: information regarding sentence<br>3. Value attributes: expression by the Expr element<br>4. Custom attributes: all kinds of information<br>Supplementary attribute: @value - value of string attributes<br>Supplementary sub-element: Expr - value of value attributes |
| QID | Identifier indicating the position in an hierarchic structure<br>Supplementary sub-element: ID |
| ID | Identifier<br>Essential attribute: @id - identifier |
| Class | Class of decoding module<br>Essential attribute: @name - name of class |

TABLE 7-continued

| | |
|---|---|
| Parameter | Defines expression of parameter<br>Essential attribute: @name - name of parameter<br>Essential sub-element: Expr - expression for computing value of parameter |
| Note | Remarks |

The connection control information and context control information can be described in the decoding module configuration information in accordance with an embodiment of the present invention by using the elements described in Tables 3 to 7 above.

In the decoding module configuration information for expressing the decoding module configuration of 1-D IDCT illustrated in FIG. 6, the connection control information and context control information can be described in XML as follows using the elements described in Tables 3 to 7.

```
<Network name="idct1d">
<Package>
<QID>
<ID id="mpeg4"/>
</QID>
</Package>
<Decl kind="Var" name="MEM_SZ">
<Expr kind="Literal" literal-kind="Integer" value="16"/>
</Decl>
<Decl kind="Var" name="COEFF_SZ">
<Expr kind="Literal" literal-kind="Integer" value="14"/>
</Decl>
<Decl kind="Var" name="SCALE_SZ">
<Expr kind="Literal" literal-kind="Integer" value="30"/>
</Decl>
<Decl kind="Var" name="ACC_SZ">
<Expr kind="Literal" literal-kind="Integer" value="32"/>
</Decl>
<Port kind="Input" name="X0"/>
<Port kind="Input" name="X1"/>
<Port kind="Input" name="ROW"/>
<Port kind="Output" name="Y0"/>
<Port kind="Output" name="Y1"/>
<Port kind="Output" name="Y2"/>
<Port kind="Output" name="Y3"/>
<Instance id="1">
<Class name="Scale">
<QID>
<ID id="cal"/>
</QID>
</Class>
<Parameter name="isz">
<Expr kind="Var" name="MEM_SZ"/>
</Parameter>
<Parameter name="osz">
<Expr kind="Var" name="SCALE_SZ"/>
</Parameter>
<Parameter name="csz">
<Expr kind="Var" name="COEFF_SZ"/>
</Parameter>
<Note kind="label" value="scale"/>
</Instance>
```

-continued

```
<Instance id="2">
<Class name="Combine">
<QID>
<ID id="cal"/>
</QID>
</Class>
<Parameter name="isz">
<Expr kind="Var" name="SCALE_SZ"/>
</Parameter>
<Parameter name="osz">
<Expr kind="Var" name="ACC_SZ"/>
</Parameter>
<Note kind="label" value="combine"/>
</Instance>
<Instance id="3">
<Class name="ShuffleFly">
<QID>
<ID id="cal"/>
</QID>
</Class>
<Parameter name="sz">
<Expr kind="Var" name="ACC_SZ"/>
</Parameter>
<Note kind="label" value="fly"/>
</Instance>
<Instance id="4">
<Class name="Shuffle">
<QID>
<ID id="cal"/>
</QID>
</Class>
<Parameter name="sz">
<Expr kind="Var" name="ACC_SZ"/>
</Parameter>
<Note kind="label" value="shuffle"/>
</Instance>
<Instance id="5">
<Class name="Final">
<QID>
<ID id="cal"/>
</QID>
</Class>
<Parameter name="isz">
<Expr kind="Var" name="ACC_SZ"/>
</Parameter>
<Parameter name="osz">
<Expr kind="Var" name="ACC_SZ"/>
</Parameter>
<Note kind="label" value="final"/>
</Instance>
<Connection src="" src-port="X0" dst="1" dst-port="X0"/>
<Connection src="" src-port="X1" dst="1" dst-port="X1"/>
<Connection src="" src-port="ROW" dst="2" dst-port="ROW"/>
<Connection src="1" src-port="Y0" dst="2" dst-port="X0"/>
<Connection src="1" src-port="Y1" dst="2" dst-port="X1"/>
<Connection src="1" src-port="Y2" dst="2" dst-port="X2">
<Attribute name="bufferSize" value="7"/>
</Connection>
<Connection src="1" src-port="Y3" dst="2" dst-port="X3"/>
<Connection src="2" src-port="Y0" dst="3" dst-port="X0"/>
<Connection src="2" src-port="Y1" dst="3" dst-port="X1"/>
<Connection src="3" src-port="Y0" dst="4" dst-port="X0"/>
<Connection src="3" src-port="Y1" dst="4" dst-port="X1"/>
<Connection src="3" src-port="Y2" dst="4" dst-port="X2"/>
<Connection src="3" src-port="Y3" dst="4" dst-port="X3"/>
<Connection src="4" src-port="Y0" dst="5" dst-port="X0"/>
<Connection src="4" src-port="Y1" dst="5" dst-port="X1"/>
<Connection src="4" src-port="Y2" dst="5" dst-port="X2"/>
<Connection src="4" src-port="Y3" dst="5" dst-port="X3"/>
<Connection src="5" src-port="Y0" dst="" dst-port="Y0"/>
<Connection src="5" src-port="Y1" dst="" dst-port="Y1"/>
<Connection src="5" src-port="Y2" dst="" dst-port="Y2"/>
<Connection src="5" src-port="Y3" dst="" dst-port="Y3"/>
</Network>
```

In the decoding module configuration information for expressing the decoding module configuration of 1-D IDCT illustrated in FIG. 7, the connection control information and context control information can be described in XML as follows using the elements described in Tables 3 to 7.

```
<Network name="idct2d">
<Package>
<QID>
<ID id="mpeg4"/>
</QID>
</Package>
<Decl kind="Var" name="INP_SZ">
<Expr kind="Literal" literal-kind="Integer" value="12"/>
</Decl>
<Decl kind="Var" name="MEM_SZ">
<Expr kind="Literal" literal-kind="Integer" value="16"/>
</Decl>
<Decl kind="Var" name="OUT_SZ">
<Expr kind="Literal" literal-kind="Integer" value="10"/>
</Decl>
<Decl kind="Var" name="PIX_SZ">
<Expr kind="Literal" literal-kind="Integer" value="9"/>
</Decl>
<Port kind="Input" name="in"/>
<Port kind="Input" name="signed"/>
<Port kind="Output" name="out"/>
<Instance id="1">
<Class name="RowSort">
<QID>
<ID id="cal"/>
</QID>
</Class>
<Parameter name="sz">
<Expr kind="Var" name="INP_SZ"/>
</Parameter>
<Note kind="label" value="sort"/>
</Instance>
<Instance id="2">
<Class name="FairMerge">
<QID>
<ID id="cal"/>
</QID>
</Class>
<Parameter name="rsz">
<Expr kind="Var" name="INP_SZ"/>
</Parameter>
<Parameter name="csz">
<Expr kind="Var" name="MEM_SZ"/>
</Parameter>
<Note kind="label" value="merge"/>
</Instance>
<Instance id="3">
<Class name="Downsample">
<QID>
<ID id="cal"/>
</QID>
</Class>
<Note kind="label" value="downsample"/>
</Instance>
<Instance id="4">
<Class name="idct1d">
<QID>
<ID id="mpeg4"/>
</QID>
</Class>
<Note kind="label" value="idct1d"/>
</Instance>
<Instance id="5">
<Class name="Separate">
<QID>
<ID id="cal"/>
</QID>
</Class>
<Parameter name="isz">
<Expr kind="Var" name="MEM_SZ"/>
</Parameter>
<Parameter name="rsz">
<Expr kind="Var" name="MEM_SZ"/>
</Parameter>
<Parameter name="csz">
<Expr kind="Var" name="OUT_SZ"/>
</Parameter>
```

-continued

```
<Note kind="label" value="demux"/>
</Instance>
<Instance id="6">
<Class name="Transpose">
<QID>
<ID id="cal"/>
</QID>
</Class>
<Parameter name="sz">
<Expr kind="Var" name="MEM_SZ"/>
</Parameter>
<Note kind="label" value="transpose"/>
</Instance>
<Instance id="7">
<Class name="Retranspose">
<QID>
<ID id="cal"/>
</QID>
</Class>
<Parameter name="isz">
<Expr kind="Var" name="MEM_SZ"/>
</Parameter>
<Parameter name="osz">
<Expr kind="Var" name="OUT_SZ"/>
</Parameter>
<Note kind="label" value="retranspose"/>
</Instance>
<Instance id="8">
<Class name="Clip">
<QID>
<ID id="cal"/>
</QID>
</Class>
<Parameter name="isz">
<Expr kind="Var" name="OUT_SZ"/>
</Parameter>
<Parameter name="osz">
<Expr kind="Var" name="PIX_SZ"/>
</Parameter>
<Note kind="label" value="clip"/>
</Instance>
<Connection src="" src-port="in" dst="1" dst-port="ROW"/>
<Connection src="" src-port="signed" dst="8" dst-port="SIGNED"/>
<Connection src="1" src-port="Y0" dst="2" dst-port="R0"/>
<Connection src="1" src-port="Y1" dst="2" dst-port="R1"/>
<Connection src="2" src-port="Y0" dst="4" dst-port="X0"/>
<Connection src="2" src-port="Y1" dst="4" dst-port="X1"/>
<Connection src="2" src-port="ROWOUT" dst="3" dst-port="R"/>
<Connection src="2" src-port="ROWOUT" dst="4" dst-port="ROW"/>
<Connection src="3" src-port="R2" dst="5" dst-port="ROW"/>
<Connection src="4" src-port="Y0" dst="5" dst-port="X0"/>
<Connection src="4" src-port="Y1" dst="5" dst-port="X1"/>
<Connection src="4" src-port="Y2" dst="5" dst-port="X2"/>
<Connection src="4" src-port="Y3" dst="5" dst-port="X3"/>
<Connection src="5" src-port="R0" dst="6" dst-port="X0"/>
<Connection src="5" src-port="R1" dst="6" dst-port="X1"/>
<Connection src="5" src-port="R2" dst="6" dst-port="X2"/>
<Connection src="5" src-port="R3" dst="6" dst-port="X3"/>
<Connection src="5" src-port="C0" dst="7" dst-port="X0"/>
<Connection src="5" src-port="C1" dst="7" dst-port="X1"/>
<Connection src="5" src-port="C2" dst="7" dst-port="X2"/>
<Connection src="5" src-port="C3" dst="7" dst-port="X3"/>
<Connection src="6" src-port="Y0" dst="2" dst-port="C0"/>
<Connection src="6" src-port="Y1" dst="2" dst-port="C1"/>
<Connection src="7" src-port="Y" dst="8" dst-port="I"/>
<Connection src="8" src-port="O" dst="" dst-port="out"/>
</Network>
```

Figure 8:
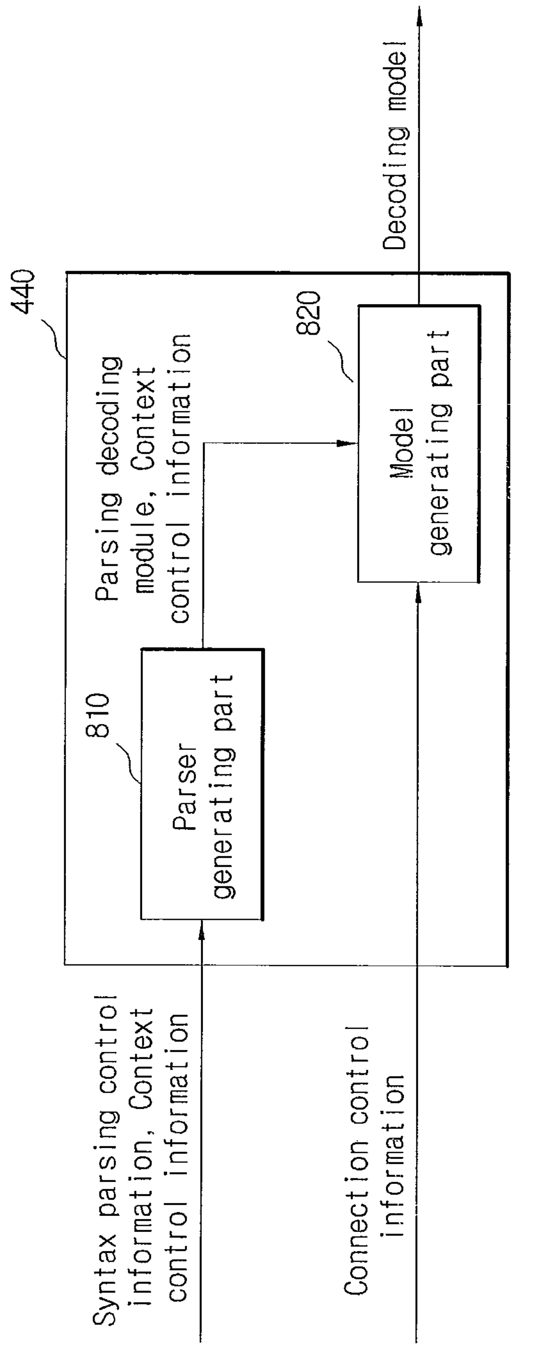
FIG. 8 is a structural diagram of a decoding model generating part in accordance with another embodiment of the present invention.

FIG. 8 is a structural diagram of a decoding model generating part in accordance with another embodiment of the present invention.

As shown in FIG. 8, the decoding model generating part 440 includes a parser generating part 810 and a model generating part 820.

The parser generating part 810 generates a parsing module by using the syntax parsing control information and context control information inputted from the decoding module configuration information analyzing part 420. Here, the generated parsing module can parse a particular bitstream structure only. The parser generating part 810 outputs the generated parsing module and context control information to the model generating part 820.

The model generating part 820 is inputted with the connection control information from the decoding module configuration information analyzing part 420.

Then, the model generating part 820 generates a decoding model by using the parsing module, context control information and connection control information. For example, the model generating part 820 defines syntax parsing of a decoding model by using the parsing module. Moreover, the model generating part 820 defines the connection relation between decoding modules in the decoding model by using the context control information and connection control information. The decoding model can include an internal process of the decoding module or a reference address of the decoding module that is stored in the decoding module storing part 430. Therefore, the decoding model can include the entire decoding process or show the entire decoding process by referring to the decoding module of the decoding module storing part 430. Then, the model generating part 820 outputs the decoding model to the decode executing part 450.

The decode executing part 450 decodes encoded data by using the inputted decoding model. For example, the decode executing part 450 is inputted with encoded data from the separating part 310 and syntax-parses the encoded data according to the parsing module that is defined in the decoding model. Here, the decode executing part 450 can modify some of the context control information by using the parsed information. Then, the decode executing part 450 decodes the encoded data by loading a necessary decoding module from the decoding module storing part 430 in accordance with the connection control information and context control information defined in the decoding model. It shall be apparent that the decoding module for decoding the encoded data can be included in the decoding model. In case the decoding apparatus in accordance with the present embodiment is made in actual hardware, the decoding module configuration information can be converted to a hardware description language (HDL), and a hardware chip can be manufactured using the converted HDL. This method can be widely compatible with designs based on codec chips that are commonly used in conventional set-top boxes, DTV converters, PMPs, DMP player and the like.

Although some embodiments of the present invention have been described above, it shall be appreciated that those of ordinary skill in the art to which the present invention pertains can change or modify the present invention without departing from the ideas and scope of the present invention, which shall be defined by the appended claims below.

The invention claimed is:

1. An adaptive decoding apparatus configuring a decoding process adaptively based on an encoding format of inputted data, the apparatus comprising:

a separating part configured to separate decoding module configuration information and encoded data from inputted data received from an outside and to output the decoding module configuration information and the encoded data;

a decoding module storing part configured to store a plurality of decoding modules, the decoding modules being configured to perform a predetermined unit of partial decoding process;

a decoding module configuration information analyzing part configured to analyze the encoded data according to the decoding module configuration information and to generate and output syntax parsing control information and connection control information; and a decode executing part configured to form a reconfigured decoder by loading and connecting target decoding modules from the decoding module storing part by use of the connection control information and to decode the encoded data according to the syntax parsing control information by use of the reconfigured decoder, wherein the plurality of decoding modules comprise:

a parsing module configured to syntax-parse and output the encoded data by using the syntax parsing control information; and a plurality of processing modules for decoding the syntax-parsed data, wherein the parsing module comprises:

an output part comprising at least one output port;

an information analyzing part configured to extract a length of data and an output port number by using the syntax parsing control information, the data constituting the encoded data;

a parsing part configured to extract partial data corresponding to the length from the encoded data; and a port assigning part configured to assign the partial data to a corresponding output port according to the output port number and to provide the partial data to the output part.

2. The apparatus according to claim 1, wherein the syntax parsing control information comprises at least one of order information, length information and output port information of partial data constituting the encoded data.

3. The apparatus of claim 1, wherein the connection control information comprises at least one of port information on the plurality of decoding modules, connection information on input/output port between the plurality of decoding modules and identification information on a position in a hierarchic structure of the plurality of decoding modules.

4. The apparatus of claim 1, further comprising a decompressing part configured to decompress and output the decoding module configuration information in case the decoding module configuration information is compressed in a binary code.

5. The apparatus of claim 4, wherein the decoding module configuration information is described based on XML (extensible markup language).

6. The apparatus of claim 1, wherein the decoding module configuration information is described based on XML (extensible markup language).

7. An adaptive decoding apparatus configuring a decoding process adaptively based on an encoding format of inputted data, the apparatus comprising:

a separating part configured to separate decoding module configuration information and encoded data from received inputted data and to output the decoding module configuration information and the encoded data;

a decoding module storing part configured to store a plurality of decoding modules, the decoding modules being configured to perform a predetermined unit of partial decoding process;

a decoding module configuration information analyzing part configured to analyze the encoded data according to the decoding module configuration information and to generate and output syntax parsing control information and connection control information;

a decoding model generating part configured to generate target decoding modules and a decoding model by using the connection control information, the target decoding modules being needed for a decoding process of the encoded data, the decoding model indicating a connection relation between the target decoding modules; and a decode executing part configured to form a reconfigured decoder by loading and connecting the target decoding modules from the decoding module storing part by use of the decoding model and to syntax-parse and decode the encoded data according to the syntax parsing control information through the reconfigured decoder, wherein the plurality of decoding modules comprise:

a parsing module configured to syntax-parse and output the encoded data by using the syntax parsing control information; and a plurality of processing modules for decoding the syntax-parsed data, wherein the parsing module comprises:

an output part comprising at least one output port;

an information analyzing part configured to extract a length of data and an output port number by using the syntax parsing control information, the data constituting the encoded data;

a parsing part configured to extract partial data corresponding to the length from the encoded data; and a port assigning part configured to assign the partial data to a corresponding output port according to the output port number and to provide the partial data to the output part.

8. A method of adaptive decoding by an adaptive encoding apparatus to configure a decoding process adaptively based on a decoding format of inputted data, the method comprising:

separating decoding module configuration information and encoded data from received inputted data;

generating syntax parsing control information and connection control information on the encoded data by using the decoding module configuration information;

forming a reconfigured decoder by loading and connecting at least one decoding module among a plurality of predetermined decoding modules according to the connection information; and syntax-parsing and decoding the encoded data by using the syntax parsing control information through the reconfigured decoder, wherein the syntax-parsing and decoding of the encoded data by using the syntax parsing control information through the reconfigured decoder comprises:

extracting a length of partial data constituting the encoded data and an output port number by using the syntax parsing control information;

extracting partial data corresponding to the extracted length from the encoded data; and assigning and outputting the partial data to an output port corresponding to the output port number.

9. The method of claim 8, wherein the decoding module comprises a parsing module for syntax-parsing the encoded data and a plurality of process modules for decoding the syntax-parsed data, and the forming of the reconfigured decoder comprises:

loading the parsing module for syntax-parsing the encoded data; and forming the reconfigured decoder by loading and connecting the plurality of process modules at a tail end of the parsing module according to the connection control information.

10. The method of claim 8, further comprising, prior to the generating of syntax parsing control information and connection control information on the encoded data by using the decoding module configuration information, decompressing compressed decoding module configuration information if the decoding module configuration information is compressed.

11. The method of claim 8, wherein the syntax parsing control information comprises at least one of order information, length information and output port information of partial data constituting the encoded data.

12. The method of claim 8, wherein the connection control information comprises at least one of port information on the plurality of decoding modules, connection information on input/output port between the plurality of decoding modules and identification information on a position in a hierarchic structure of the plurality of decoding modules.

13. A method of adaptive decoding by an adaptive encoding apparatus to configure a decoding process adaptively based on a decoding format of inputted data, the method comprising:

separating decoding module configuration information and encoded data from received inputted data;

generating syntax parsing control information and connection control information on the encoded data by using the decoding module configuration information;

generating target decoding modules for decoding the encoded data and a decoding model indicating a connection relation between the target decoding modules by using the connection control information;

forming a reconfigured decoder by loading and connecting at least one decoding module among a plurality of predetermined decoding modules by using the decoding model; and syntax-parsing and decoding the encoded data by using the syntax parsing control information through the reconfigured decoder, wherein the syntax-parsing and decoding of the encoded data by using the syntax parsing control information through the reconfigured decoder comprises:

extracting a length of partial data constituting the encoded data and an output port number by using the syntax parsing control information;

extracting partial data corresponding to the extracted length from the encoded data; and assigning and outputting the partial data to an output port corresponding to the output port number.

* * * * *